S. R. ANTHONY.
PUMP CONNECTION.
APPLICATION FILED NOV. 27, 1916.
1,266,192.
Patented May 14, 1918.
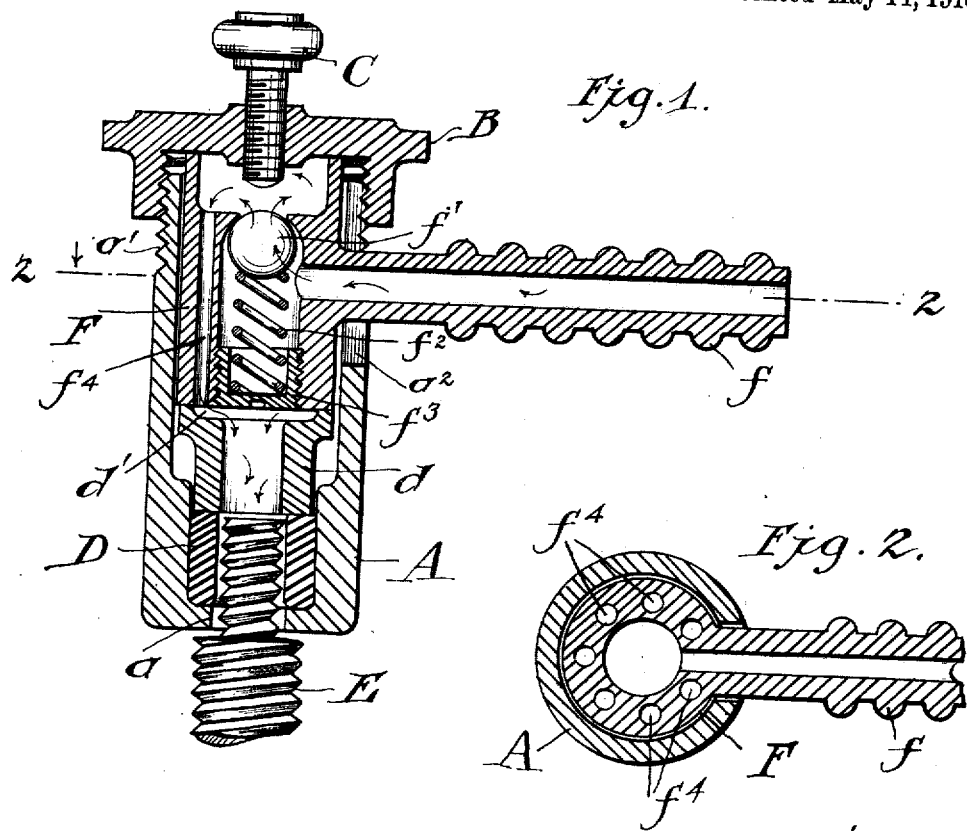
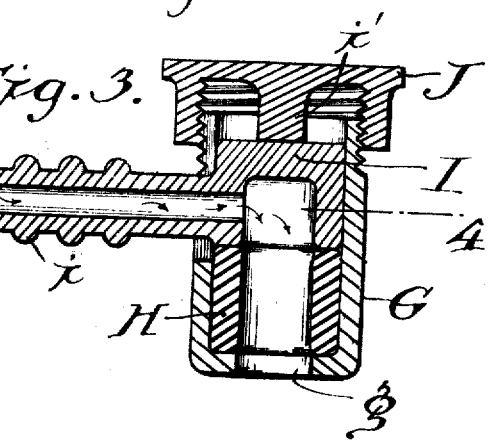
Witness:
C. Gabriski
Inventor:
Sidney R. Anthony.
By Jas. H. Griffin.
Attorney.

UNITED STATES PATENT OFFICE.

SIDNEY R. ANTHONY, OF NEW YORK, N. Y.

PUMP CONNECTION.

1,266,192.  Specification of Letters Patent.  Patented May 14, 1918.

Application filed November 27, 1916.  Serial No. 133,639.

*To all whom it may concern:*

Be it known that I, SIDNEY R. ANTHONY, a citizen of the United States, residing in the city of New York, borough of Manhattan, county and State of New York, have invented a certain new and useful Pump Connection, of which the following is a specification.

This invention is a pump connection and the object of the invention is to provide simple and efficient means for expeditiously connecting the nipple of a pneumatic vehicle tire to an air compressing pump or to a reservoir containing air under compression. More specifically stated, the invention embodies an embraced coupling or connection, adapted to be normally, fixedly secured to the delivery tube of the tire pump or pressure tank, which is provided with a resilient portion adapted, when brought into a position to embrace the tire nipple, to be contracted, by suitable means, in order that said resilient member may tightly grip the nipple and securely maintain the connection in coöperative relation thereto.

A further feature of the invention is embodied in valve mechanism adapted to normally seal the delivery tube of the pressure tank with which the connection is associated to preclude wasteful escape of compressed air at such times as it is not desired to feed the same to the tire and with the connection is associated means, operating on said valve during desired periods to maintain the valve unseated, and to allow of the inflating of the tire. This latter means is controllable by the operator, preferably independently of the means which holds the connection or coupling in position on the tire nipple, so that the valve may remain seated during the positioning of the coupling on and the removal of the same from the nipple.

Features of the invention, other than those specified, will be apparent from the following detailed description, when read in conjunction with the accompanying drawings.

In the accompanying drawings I have illustrated different practical embodiments of the invention, but the construction therein shown is to be understood as illustrative only, and not as defining the limits of the invention.

Figure 1 is a central vertical section of the preferred embodiment of the invention, employed in conjunction with a compressed air storage tank.

Fig. 2 is a transverse section on line 2—2 of Fig. 1.

Fig. 3 is a central vertical section of the preferred embodiment of the invention when used in conjunction with a tire pump, and Fig. 4 is a section on line 4—4 of Fig. 3.

Referring to the drawings and more particularly to Figs. 1 and 2 thereof, A designates a substantially tubular casing which is closed at its lower end with the exception of an opening $a$ through which the end of a tire nipple may be introduced into the casing. The upper portion of the casing A is threaded as at $a'$ to receive a screw cap B, and through the center of the screw cap B is threaded a thumb screw C, the function of which will hereinafter appear.

Within the lower portion of the casing A is seated an annulus of resilient material D preferably rubber, the interior diameter of which is preferably specifically equal to the interior diameter of the aperture $a$ in the casing, so that the end of a tire nipple E may extend into the casing and be positioned interiorly of the annulus D, which is clearly shown in Fig. 1.

Superimposed upon the annulus D is a tubular pressure plug $d$, the lower edge of which seats upon the upper edge of the annulus D, and upon the upper edge of which is adapted to seat a hosed piece F, so-called because of the fact that the same is provided with a stem $f$, which the delivery hose of the pump or pressure tank is adapted to embrace, and to which it is normally fixedly secured.

The hose piece F is substantially tubular in form but intermediate its upper and lower edges is interiorly provided with a contracted portion forming a seat for a ball-valve $f'$, which is normally maintained seated by a helical spring $f^2$, the lower end of which is seated in a thimble $f^3$ screwed in from the bottom of the hose piece F. The stem $f$ of the hose piece is tubular in form, and its interior passage leads into the interior of the hose piece F so that the interior of said hose piece is, at all times, in communication with the pressure or compression chamber. The compressed air fed to the interior hose piece F is, however, normally precluded from passage therefrom by the ball-valve $f'$ which closes the chamber.

It will be apparent that, if the ball-valve $f'$ is unseated with the pressure within the interior of the hose piece F, it will be communicated to that portion of the hose piece intermediate the valve seat and the screw cap B, and from this point it is led to the tire through a plurality of ducts or passages $f^4$ extending longitudinally through the walls of the hose piece as shown best in Figs. 1 and 2. In order that the compressed air passing through ducts $f^4$ can not be obstructed in issuing from the lower ends of said ducts, the upper face of the pressure plug $d$ is preferably dished, as shown at $d'$, so that the compressed air may have unrestricted circulation from the ducts $f^4$ to the open end of the tire nipple E.

The annulus D, pressure plug $d$ and hose piece F, when superimposed upon one another are, collectively, of such dimensions to exceed the interior depth of the casing A, so that the upper portion of the hose piece F will normally protrude beyond the upper end of said casing, as shown in Fig. 1, so that when the screw cap B is screwed down upon the threaded portion $a'$ of the casing it will come into engagement with the upper edge of the pump piece F before it becomes seated on the upper edge of the casing.

With the constituent parts of the coupling associated as specified, it will be apparent that if the screw cap B is screwed down upon the casing A, such operation will depress the hose piece F and the pressure plug with the result that this pressure will be transmitted to the resilient annulus D. As the annulus D is placed under pressure, the height of its wall will be decreased and the thickness of its wall will be correspondingly increased, with the result that the inner diameter of said annulus will be lessened. If, during this operation, the end of the tire nipple is in a position within the annulus, as shown in Fig. 1, the compression of the annulus will cause the same to tightly embrace and grip a portion of said nipple, and maintain said nipple in such tight embrace as long as the screw cap B is screwed down on the casing. In this manner, the coupling or connection may be maintained in a rigid position on a tire nipple during the inflating operation.

It will be noted that the thumb screw C, which is threaded through the screw cap B of the casing, is in alinement with the ball-valve $f'$ and, accordingly, after the coupling has been properly secured upon the nipple of the tire, the valve $f'$ may be readily unseated, to allow of the inflating operation, by merely screwing down said screw C until it comes into contact with the valve and forces the same from its seat.

As soon as sufficient pressure has been applied to the tire, the valve F may be allowed to return to its seat and shut off the supply of compressed air by merely unscrewing the said screw C at the conclusion of the inflating operation, and, after the valve has been seated, the coupling may be readily released from the tire nipple by unscrewing the threaded cap sufficiently to release the resilient annulus to such extent as to allow the ready withdrawal of the connection from the nipple. However, in removing the connection from the tire nipple, it is not absolutely essential to first unscrew the thumb screw C to seat the valve $f'$, as this thumb screw is automatically elevated when the cap B is unscrewed. Thus the operation of removing the connection will automatically allow of the seating of valve $f'$. Accordingly, in the practical operation of the connection thumb screw C may, at all times, remain in a predetermined position, or may be displaced by a fixed stem on the cap B similar to stem $f'$ of the modified construction of Fig. 3.

The movements of the hose piece, longitudinally of the casing, incident to the compressing and releasing operations of the annulus D, are allowed of by slotting the casing A longitudinally as at $a^2$. The stem $f$ extends through said slot and slides longitudinally thereof as the hose piece F is reciprocated.

The embodiment of the invention hereinbefore described is practically applicable for use in conjunction with air pressure tanks where air under the desired pressure is stored and ready for use, since the valve $f'$ serves to prevent the wasteful leakage of the stored-up air, as said air is only released when the connection is in rigid position on a tire nipple. The construction as shown and described is that which is preferably employed in this environment since, the construction shown is very economical in manufacture and very efficient in operation.

A further embodiment of the invention is when the same is employed in conjunction with foot or power compression pumps shown in Figs. 3 and 4 of the drawings. In view of the fact that when air is supplied in this manner, only such air is compressed as is necessary to inflate the tire to the desired degree, and as soon as the tire has been inflated to this extent, the operation of the pump ceases and no attempt is made to save or store up what little excess compressed air is contained within the pump cylinder or delivery tube. Accordingly, in the construction of Figs. 3 and 4, the valve for precluding leakage of compressed air when the connection is not in use, is unnecessary. This greatly simplifies the construction and allows of the elimination of several important parts of the structures of Figs. 1 and 2.

In the modified construction of Figs. 2 and 4, G is the outer shell or casing, provided at its bottom with an opening $g$ corresponding to the opening $a$, and through which opening a portion of the tire nipple may project into the casing and be embraced by the resilient annular member H. Directly superimposed upon annulus H is a hose piece I provided with a stem $i$ to which the delivery hose of the pump is connected. J is a screw cap threaded upon the casing, and provided with a depending post $i'$ adapted to engage with the hose piece I, as shown in Fig. 3. The stem $i$ is tubular and the inner passage thereof communicates with the orifice in the hose piece, which orifice is in direct communication with the interior annulus H, so that air delivered from the pump through the tubular stem $i$ passes immediately to the tire nipple, whose free ends project into the casing.

From the foregoing description, the operation of attaching the connection in Figs. 3 and 4 to a tire nipple, will be manifest, it being apparent that the screwing or unscrewing of the screw cap J regulates the pressure on the annulus H, thereby causing the same to either grip or release the end of the tire nipple over which the coupling is positioned.

While two distinct forms of the invention have been described, each is particularly adapted to its respective environment, and it will be understood that their use is not essentially limited as described. If desired, the construction of Figs. 1 and 2 might be used with a foot or other pump instead of with a pressure tank, in which former case the thumb screw C will simply be screwed down to maintain the valve $f'$ unseated, at all times, so that, as pressure is generated in the pump, it can be immediately transmitted to the tire. On the other hand, the construction of Figs. 3 and 4 might be used in conjunction with a pressure tank, in which instance the delivery tube or pipe leading from the tank to the connection should be equipped with some sort of valve so that, when the coupling is not on a tire all of the air in the tank will not be exhausted and wasted.

For these reasons, it is manifest that the invention is not limited to the specific details of the construction described, but is to be considered as broadly novel as is commensurate with the appended claims.

Having thus fully described the invention, what I claim as new, and desire to secure by Letters Patent, is:

1. In a device of the class described, the combination of a tubular casing provided with an aperture through which a portion of a tire nipple may extend, a resilient annulus positioned within the casing and encircling said portion of the tire nipple, a member slidable longitudinally of the casing and provided with a passage through which compressed air may be fed into the casing, a valve for normally sealing said passage, a threaded cap for the casing which threaded cap, when screwed upon the casing forces the slidable member longitudinally of the casing and compresses the resilient annulus to cause the same to grip the tire nipple and manually adjustable means coöperating with the threaded cap and operable to control the operations of said valve.

2. In a device of the class described, the combination of a tubular casing provided with an aperture through which a portion of a tire nipple may extend, a resilient annulus positioned within the casing and encircling said portion of the tire nipple, a member slidable longitudinally of the casing and provided with a passage through which compressed air may be fed into the casing, a valve for normally sealing said passage, a threaded cap for the casing which threaded cap when screwed upon the casing forces the slidable member longitudinally of the casing and compresses the resilient annulus to cause the same to grip the tire nipple and a thumb screw threaded through the threaded cap and operable to control the operations of said valve.

3. In a device of the class described, the combination of a tubular casing provided with an aperture through which a portion of a tire nipple may extend, a resilient annulus positioned within the casing and encircling said portion of the tire nipple, a member slidable longitudinally of the casing and provided with a passage through which compressed air may be fed into the casing, a valve for normally sealing said passage, a threaded cap for the casing, which threaded cap, when screwed upon the casing, forces the slidable member longitudinally of the casing and compresses the resilient annulus to cause the same to grip the tire nipple, and means associated with the threaded cap for unseating the valve to allow compressed air to flow through the passage to the tire nipple.

In testimony whereof I have signed my name to this specification.

SIDNEY R. ANTHONY.